United States Patent [19]

Spotswood et al.

[11] Patent Number: 4,905,937

[45] Date of Patent: Mar. 6, 1990

[54] POD ASSEMBLY WITH INTEGRATED RADIOFREQUENCY EMITTING AND AERIAL REFUELING EQUIPMENT

[75] Inventors: David T. Spotswood, Derby; Richard C. Robinson, Wichita, both of Kans.

[73] Assignee: The Boeing Company, Seattle, Wash.

[21] Appl. No.: 254,694

[22] Filed: Oct. 7, 1988
(Under 37 CFR 1.47)

[51] Int. Cl.⁴ .......................... B64D 39/02; B64C 1/36
[52] U.S. Cl. .......................... 244/137.4; 244/135 A
[58] Field of Search ............ 244/135 A, 135 R, 137.4, 244/1 R; 342/13, 14, 16

[56] References Cited

U.S. PATENT DOCUMENTS

| | | | |
|---|---|---|---|
| 2,879,016 | 3/1959 | Haase | 244/135 |
| 2,973,171 | 2/1961 | Ward et al. | 244/135 |
| 2,995,321 | 8/1961 | Zeitler | 244/135 |
| 3,091,419 | 5/1963 | Mosher | 244/135 A |
| 3,339,201 | 8/1967 | Fisher et al. | 343/18 |
| 4,534,384 | 8/1985 | Graham et al. | 244/135 A |
| 4,674,704 | 6/1987 | Altoz et al. | 244/1 R |

FOREIGN PATENT DOCUMENTS

| | | | |
|---|---|---|---|
| 952324 | 11/1956 | Fed. Rep. of Germany | 244/137.4 |
| 1047632 | 6/1957 | Fed. Rep. of Germany | 244/135 A |
| 2311433 | 9/1974 | Fed. Rep. of Germany | 244/137.4 |

Primary Examiner—Galen Barefoot
Attorney, Agent, or Firm—Finnegan, Henderson, Farabow, Garrett & Dunner

[57] ABSTRACT

A pod assembly for attachment to an aircraft including a pod housing and a fairing housing mounted on the pod housing. A bulkhead divides the pod housing into first and second compartments. The first compartment is for containing radiating electronic apparatus, such as an electronic countermeasures system. The second compartment and the fairing housing are for containing aerial refueling equipment, such as a hose-and-drogue system and power generating apparatus for the provision of power to the electronics and refueling equipment contained therein. Air from the first compartment is used for cooling the first compartment and ventilating the second compartment.

16 Claims, 6 Drawing Sheets

POD ASSEMBLY WITH INTEGRATED RADIOFREQUENCY EMITTING AND AERIAL REFUELING EQUIPMENT

BACKGROUND OF THE INVENTION

1. Field of the Invention

The present invention relates to a pod assembly for attachment to an aircraft.

2. Description of Related Art

Known pods or pod assemblies have been fastened to an aircraft for carrying either radiating electronic equipment, such as an electronic countermeasures system for producing electromagnetic jamming waves, or equipment containing volatile and flammable liquids, such as aerial refueling equipment for transferring fuel from the host aircraft to another aircraft in flight. Typically, such equipment is separately mounted in a pod or pods attached to the wing or contained within the fuselage of the aircraft.

Heretofore, radiating electronic equipment and aerial refueling equipment have not been combined in a single pod because of prevailing safety concerns over the use of radiating high power electronics in the vicinity of highly combustible aviation fuel vapors, and a corresponding desire to avoid the possibility of explosions. Thus, more than one pod has been employed to provide the physical separation previously believed to be necessary when radiating electronic equipment and aerial refueling equipment are transported by a single aircraft. The mounting of an additional pod on the aircraft to provide the physical separation increases the aerodynamic drag, wing stress and the overall weight of the aircraft. The desire to reduce drag is especially strong at times when the refueling hose and the attached paradrogue have been extended from the host aircraft in preparation for refueling the trailing aircraft.

SUMMARY OF THE INVENTION

The object of the present invention is to minimize the number of externally mounted pods or pod assemblies necessary to transport both radiating electronic equipment and aerial refueling equipment by an aircraft, thus reducing wing stress, drag and structural weight.

To achieve this object, and in accordance with the invention as embodied and broadly described herein, a pod assembly for external attachment to an aircraft is provided, comprising: a pod housing having leading and trailing ends and a bulkhead dividing the pod housing into first and second compartments, the first compartment in the pod housing for containing equipment including radiating electronic apparatus and the second compartment in the pod housing for containing equipment including a refueling hose and a hose reel assembly for aerial refueling; means for cooling the first compartment and for ventilating the second compartment; and means for attaching the pod housing to the aircraft.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings which are incorporated in and constitute a part of the specification, illustrate a preferred embodiment of the invention and, together with the summary of the invention given above and the detailed description of the preferred embodiment given below, serve to explain the principles of the invention.

DESCRIPTION OF THE PREFERRED EMBODIMENT

Figure 1:
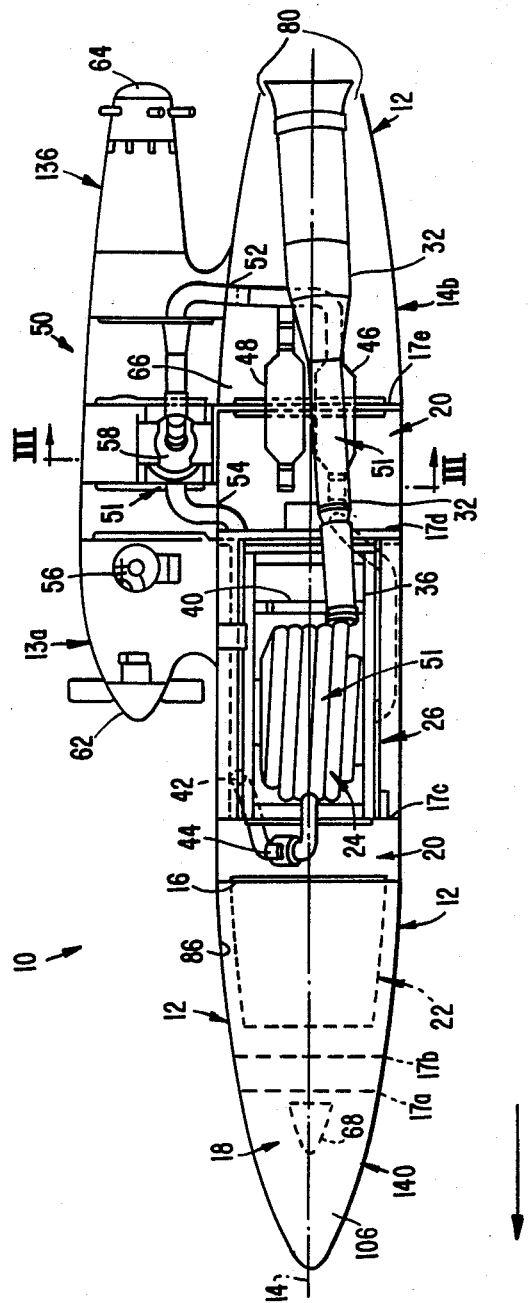
FIG. 1 is a plan view of a pod assembly incorporating the teachings of the present invention, shown in partial cutaway to illustrate the interior of the fairing housing and a rearward portion of the pod housing.

Reference will now be made in detail to the present preferred embodiment of the invention, an example of which is illustrated in the accompanying drawings wherein like reference numerals refer to like parts.

In accordance with the invention, there is provided a pod assembly for external attachment to an aircraft comprising a pod housing having leading and trailing ends and a bulkhead dividing the pod housing into first and second compartments.

Figure 2:
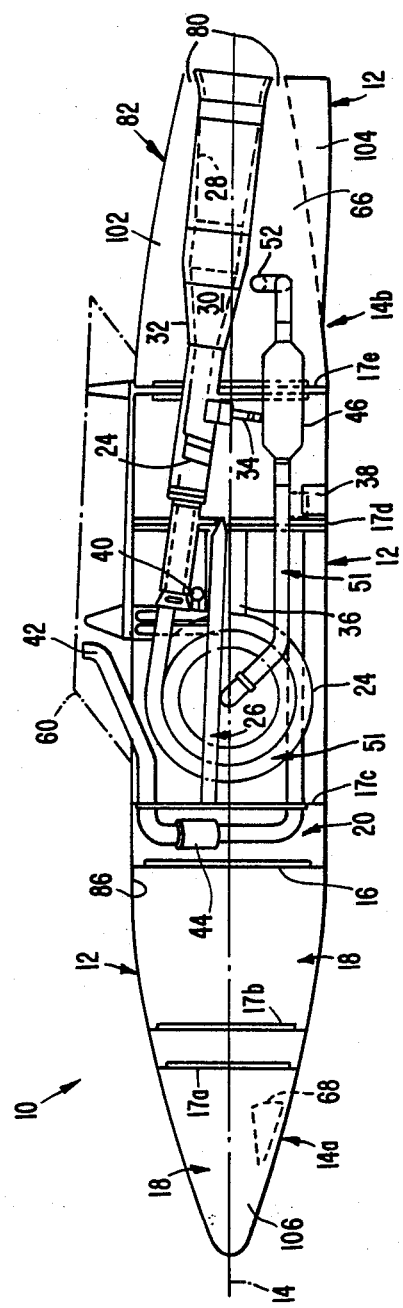
FIG. 2 is an elevational view of the pod assembly illustrated in FIG. 1.
Figure 3:
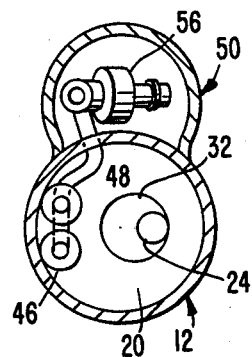
FIG. 3 is a transverse sectional view, taken along line III—III of FIG. 1.

A preferred embodiment of the pod assembly is shown in FIGS. 1 and 2, and is represented generally by the numeral 10. As embodied herein, pod assembly 10 is comprised of pod housing 12 having a central axis 14 extending forward and rearward through the housing, between aerodynamic leading end 14a and trailing end 14b, and a bulkhead 16 dividing pod housing 12 into first and second compartments 18, 20. Bulkhead 16 is transversely mounted in pod housing 12, and first compartment 18 is disposed forward of second compartment 20, in the direction of flight indicated by the arrow. Additional bulkheads may be provided in pod housing 12, such as bulkheads 17a, 17b, 17c, 17d and 17e to furnish structural support for pod housing 12, and to further subdivide first and second compartments 18, 20 and provide support for equipment contained therein.

Figure 5:
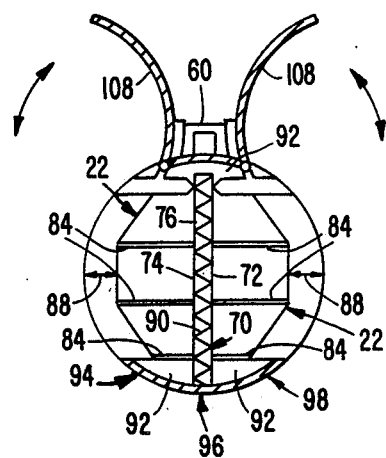
FIG. 5 is a transverse sectional view, taken along line V—V of FIG. 4.
Figure 4:
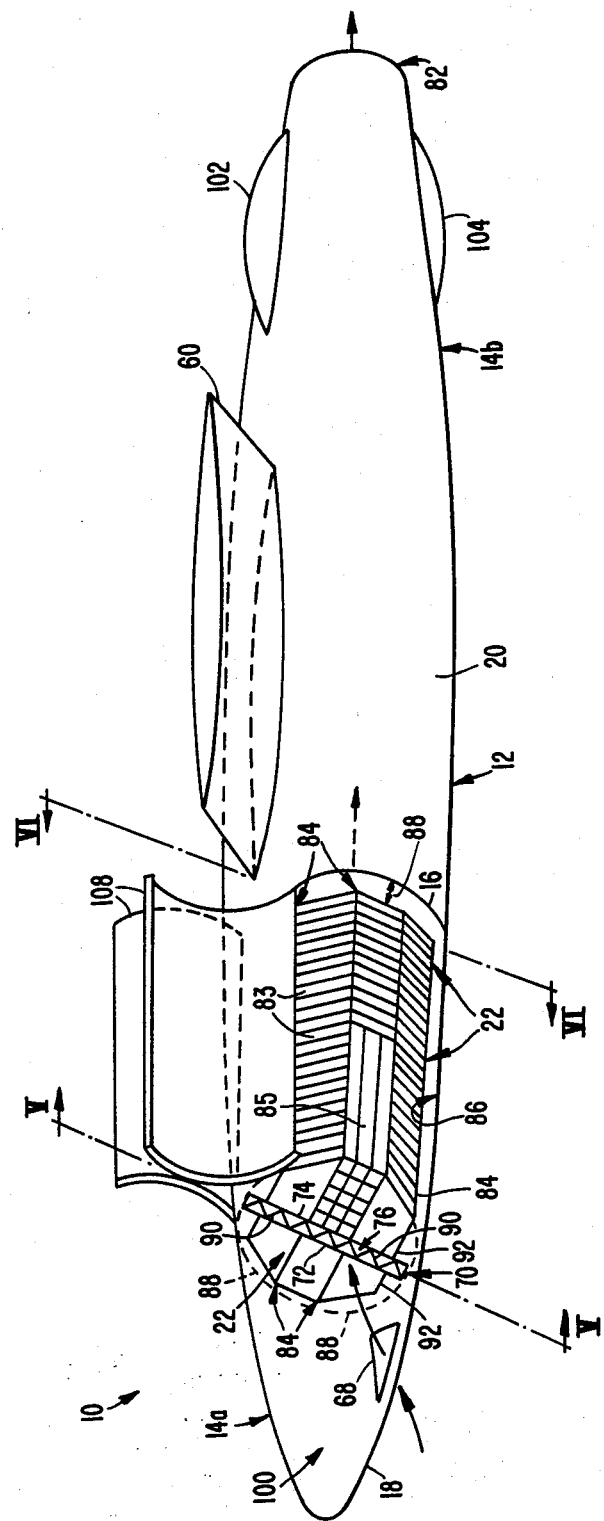
FIG. 4 is an orthographic sketch of the pod assembly illustrated in FIG. 1, absent the fairing housing for illustration purposes, showing the first compartment in partial cutaway with the maintenance access doors raised to illustrate the interior of a forward portion of the pod housing.

In accordance with the invention, the first compartment in the pod housing is for containing equipment including radiating electronic apparatus. As embodied herein, and as best illustrated in FIGS. 4 and 5, radiating electronic apparatus comprising an electronic countermeasures system, generally referred to by the numeral 22, is contained in first compartment 18 of pod housing 12.

In accordance with the invention, the second compartment in the pod housing is for containing equipment, including a refueling hose and a hose reel assembly, for aerial refueling. As embodied herein, as illustrated in FIGS. 1 and 2, refueling hose 24 and hose reel assembly 26 are contained in second compartment 20 of pod housing 12. Other typical aerial refueling equipment contained in second compartment 20 preferably includes a paradrogue 28 and reception coupling 30, shown in phantom retracted within paradrogue stowage tube assembly 32, guillotine valve assembly 34 (FIG. 2), hydraulic control assembly 36, controller system 38 (FIG. 2), hose positioner 40, fuel inlet 42, fuel flow transmitter 44, venturi 46 and surge suppressor 48.

The invention includes a fairing housing mounted on the pod housing for containing equipment exterior to the pod housing. As embodied herein, and as best illustrated in FIG. 1, fairing housing 50 is mounted external to housing 12 and adjacent to second compartment 20 and has a leading end 13a disposed rearward of first compartment 18 of pod housing 12, and a trailing end 13b. The balance of the equipment necessary for aerial refueling, and not otherwise contained in pod housing 12, may be contained in fairing housing 50. Common openings such as 52, 54 are provided for interconnecting selected equipment in the pod housing 12 and fairing housing 50. Preferably, hydraulic reservoir 56 and fuel pump 58 are contained in fairing housing 50 and are interconnected via openings 52, 54 to points downstream of fuel flow transmitter 44 and upstream of venturi 46 and surge suppressor 48. Thus, the aerial refueling equipment contained in the pod housing 12 and fairing housing 50 comprises a complete conventional hose-and-drogue aerial refueling system, referred to generally by the numeral 51 (FIG. 1).

It has been determined that the placement of radiating electronics equipment such as electronic countermeasures system 22, and aerial refueling equipment such as hose-and-drogue system 51, in a single pod such as pod assembly 12, as embodied herein, will have no adverse effect on operation of systems 22, 51.

In a preferred embodiment, apparatus for providing power to operate the equipment contained in the pod housing 12 and the fairing housing 50 comprises turbines, such as conventional ram-air type turbines 62, 64, mounted on the leading and trailing ends 13a and 13b, respectively, of fairing housing 50. Turbine 62 may provide the required hydraulic power for the aerial refueling equipment, such as pump 56 and hose reel assembly 26, and turbine 64 may provide the required electrical power for electronic countermeasures system 22 and hose-and-drogue system 51. Accordingly, power for operation of the systems 22, 51 contained in pod assembly 10 may be provided independent of the aircraft power systems. Of course, provision may also be made for a host aircraft to supply part or all of the necessary hydraulic and electrical power, making the provision of fairing housing 50 unnecessary. Location of the turbines 62, 64 is not restricted to the fairing housing 50. Placement of a turbine on the pod housing 12 forward of the electronic countermeasures system 22, however, would likely interfere with its operation. A turbine suitable for mountinq internal to pod housing 12, such as an impulse-type turbine (not shown), may be provided, for example, in space 66 to the inboard side of or below the plane of tube assembly 32 in second compartment 20 (FIGS. 1 and 2).

Figure 6:
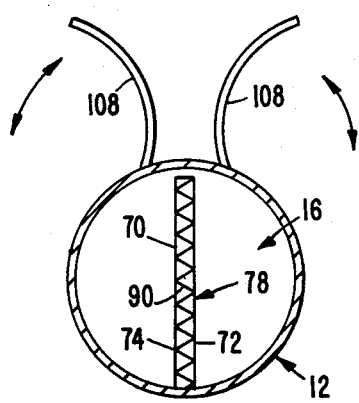
FIG. 6 is a transverse sectional view, taken along line VI—VI of FIG. 4.

In accordance with the invention, there is provided means for cooling the first compartment and ventilating the second compartment to prevent accumulation of aviation fuel vapors. As embodied herein, and as illustrated in FIGS. 4 and 5, the means for cooling and ventilating includes a first opening such as ram air scoop 68 formed in first compartment 18. First opening or air scoop 68, which is positioned and shaped to minimize drag forces, is disposed forward of and below the electronic countermeasures system 22. Conduit means, such as hollow partition 70, are disposed in, and subdivide a portion of, first compartment 18. Preferably, partition 70 is positioned coaxially with central axis 14 and is formed by vertical, spaced parallel planar members 72, 74 attached to and providing structural support for pod housing 12 and components mounted thereon. Air entering the first compartment 18 via air scoop 68 (see arrows, FIG. 4) flows into partition 70 at a first open end 76 formed by members 72, 74, and flows in the rearward direction between members 72, 74 toward bulkhead 16. Partition 70 is disposed to penetrate bulkhead 16 and channel the air flowing between members 72, 74 through second open end 78 (FIG. 6) formed by members 72, 74, similar to first open end 76. Air entering partition 70 via first open end 76 flows into second compartment 20 in pod housing 12, and is ultimately discharged from pod housing 12 at second opening 80 (FIGS. 1 and 2) formed in extreme rearward end 82 of pod housing 12. The air flowing between air scoop 68 in first compartment 18 and second opening 80 in second compartment 20 removes heat dissipated by the electronic countermeasures system 22, and flushes to ambient any fuel vapors from the aerial refueling equipment contained in second compartment 20.

A preferred embodiment includes means mounted on the hollow partition for supporting electronic equipment in a spaced position and for conducting heat dissipated by the electronic equipment to the partition. As embodied herein, the electronic countermeasures system 22 includes dual, multi-layer electronic circuit cards configured as modules 83 and supported in position by a thermally conductive rack 84 mounted on members 72, 74 of hollow partition 70. Rack 84 is preferably a standard avionics rack used in the industry for providing rack-cooling of electronic components, such as a power supply 85 and modules 83, housed in a pod or similar container. Heat dissipated by the modules 83 and power supply 85 is conducted by rack 84 to the members 72, 74 of partition 70, which operates as a heat sink and heat exchanger in combination with the air flowing between the first and second compartments 18, 20 of pod housing 12. This packaging concept reduces weight significantly while optimizing the use of available space within the varying geometry of first compartment 18. Preferably, modules 83 are supported on rack 84 a distance from the skin 86 of pod housing 12 for free air circulation and additional cooling through spaces 88. This spacing also provides for clearance (rattle-space) between the maintenance access doors 108 and electronic modules 83 to prevent vibration damage to the modules 83 due to differences in inertial masses and attendant vibration. Additional means of cooling the electronic countermeasures system 22 could also be used, such as a refrigerant liquid or gas. Preferably, hollow partition 70 is provided with baffling 90 attached to members 72, 74 for added structural strength and to increase the heat transfer area.

Raceways, such as raceways 92, may be provided for electrical cable (not shown) connected to the electronic countermeasures system 22, the hose-and-drogue system 51, and the aircraft. Ancillary equipment for electronic countermeasures system 22 may be provided in first compartment 18, such as memory loader verifier connector 94, ground cooling adaptor 96 and ground power connector 98. Antenna radomes 100, 102 and 104 may be provided on pod housing 12 (FIG. 5), and additional radiating electronics equipment such as antennae (not shown), may be housed forward in nose 106, and rearward in space 66. Maintenance access doors 108 may be raised to expose interior portions of first compartment 18.

The invention further includes means for attaching the pod housing to the aircraft. As embodied herein and as best illustrated in FIG. 4, conventional streamlined pylon 60 is provided to attach pod housing 12 to an aircraft (not shown).

In sum, the present invention provides a pod assembly 12 for attachment to an aircraft in which radiating electronic apparatus, such as electronic countermeasures system 22, and aerial refueling equipment, such as hose-and-drogue system 51, are integrated in close proximity. The systems 22, 51 may be operated separately or simultaneously, using power from turbines such as ram air turbines 62, 64 mounted on fairing housing 50, or from host aircraft secondary power systems. The heat dissipated by the electronic countermeasures system 22 and any fuel vapors from the hose-and-drogue system 51 are removed from pod assembly 12 by ambient air flowing into the first compartment 18 via scoop 68, through hollow partition 70 and second compartment 20, and exiting to ambient via second opening 80. Bulkhead 16 prevents contaminants from the hose-and-drogue system 51 from impairing the operation of the electronic countermeasures system 22.

It will be apparent to those skilled in the art that various modifications, variations and additions can be made in the present invention without departing from the spirit or scope of the present invention. Thus, it is intended that the present invention cover the modifications and variations provided they come within the general scope of the claims and their equivalents.

What is claimed is:

1. A pod assembly for external attachment to an aircraft, comprising:
   a pod housing having leading and trailing ends and a bulkhead dividing said pod housing into first and second compartments, said first compartment in said pod housing for containing equipment including radiating electronic apparatus and said second compartment in said pod housing for containing equipment including a refueling hose and a hose reel assembly for aerial refueling;
   means for cooling the first compartment and for ventilating the second compartment; and
   means for attaching said pod housing to said aircraft.

2. The pod assembly recited in claim 1, wherein:
   the bulkhead is transversely mounted to define said first compartment at the leading end of said pod housing.

3. The pod assembly recited in claim 1, further comprising:
   a fairing housing mounted on said pod housing for containing equipment exterior to the pod housing.

4. The pod assembly recited in claim 3, wherein:
   the fairing housing has a leading end disposed rearward of said first compartment.

5. The pod assembly recited in claim 3, wherein:
   the equipment contained in the fairing housing includes a hydraulic reservoir and a fuel pump of the aerial refueling equipment.

6. The pod assembly recited in claim 3, wherein:
   said pod housing and the fairing housing include a plurality of common openings interconnecting selected equipment disposed in said pod housing and the fairing housing.

7. The pod assembly recited in claim 3, wherein:
   one of said pod housing and fairing housing includes apparatus for providing power to operate the equipment contained in both said pod housing and fairing housing.

8. The pod assembly recited in claim 7, wherein:
   the fairing housing includes at least one ram air turbine for providing power to operate the equipment.

9. The pod assembly recited in claim 1, wherein:
   the means for attaching includes a pylon.

10. The pod assembly recited in claim 1, wherein:
    said means for cooling and ventilating includes a first opening formed in said pod housing for introduction of air into said first compartment, conduit means penetrating said bulkhead between said first and second compartments for directing said air from the first compartment to the second compartment, and a second opening formed in the pod housing for exhausting said air from the second compartment to ambient.

11. The pod assembly recited in claim 10, wherein:
    the first opening is disposed in the first compartment forward of the radiating electronic apparatus and the second opening is disposed at the rearward end of the second compartment, in relation to the direction of flight.

12. The pod assembly recited in claim 11, wherein:
    the conduit means includes a hollow partition attached to the pod and subdividing a portion of the first compartment, said partition formed by a pair of vertical spaced planar parallel structural support members, said partition having a first open end adjacent the first opening for channeling air entering the first compartment to interior of said partition between said members and a second open end penetrating the bulkhead for discharging air flowing in said partition into the second compartment.

13. The pod assembly recited in claim 12, further comprising means mounted on the hollow partition for supporting electronic equipment in a spaced position and for conducting heat dissipated by the electronic equipment to the partition.

14. The pod assembly recited in claim 1, wherein the electronic equipment is comprised of electronic countermeasures equipment.

15. The pod assembly recited in claim 14, wherein the electronic countermeasures equipment includes a plurality of spaced modules comprised of electronic circuit cards.

16. A pod assembly for attachment to an aircraft, comprising:
    a pod housing having axially-spaced aerodynamic leading and trailing ends;
    a transverse bulkhead dividing said pod housing into first and second compartments at said leading and trailing ends, respectively;
    a fairing housing mounted on said pod housing, said fairing housing having a leading end disposed rearward of said first compartment;
    an electronic countermeasures system contained in said first compartment;
    a hose-and-drogue aerial refueling system contained in both said second compartment and said fairing housing;
    a plurality of common openings in said pod housing and fairing housing for interconnecting selected equipment disposed in the pod housing and fairing housing;
    means, mounted on said fairing housing, for providing power to operate both said systems;
    means for cooling said first compartment and ventilating the second compartment; and
    means for attaching the pod housing to the aircraft.

* * * * *

UNITED STATES PATENT AND TRADEMARK OFFICE
CERTIFICATE OF CORRECTION

PATENT NO. : 4,905,937
DATED : March 6, 1990
INVENTOR(S) : David T. Spotswood and Richard C. Robinson It is certified that error appears in the above-identified patent and that said Letters Patent is hereby corrected as shown below:

Column 3, line 54, change "mountinq" to --mounting--.

Signed and Sealed this

Nineteenth Day of February, 1991

Attest:

HARRY F. MANBECK, JR.

*Attesting Officer*  *Commissioner of Patents and Trademarks*